United States Patent Office 3,111,563
Patented Nov. 19, 1963

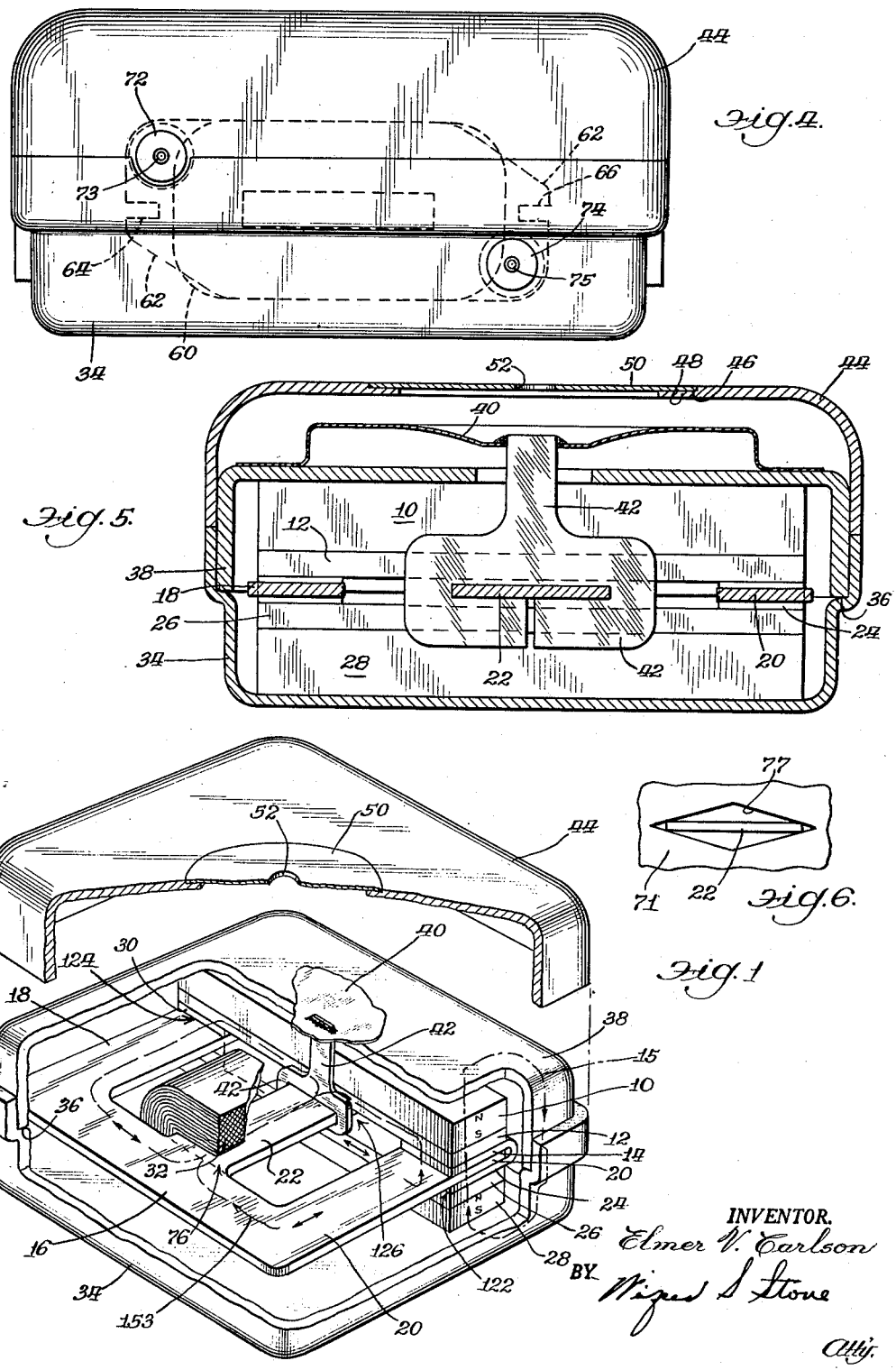

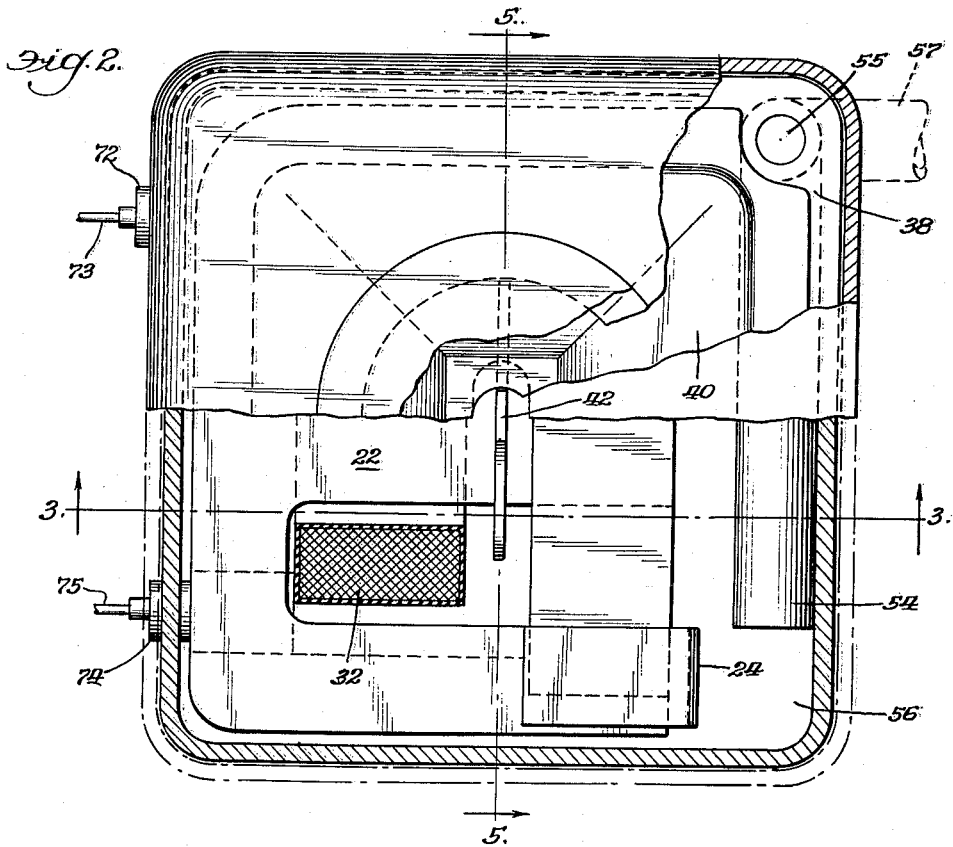
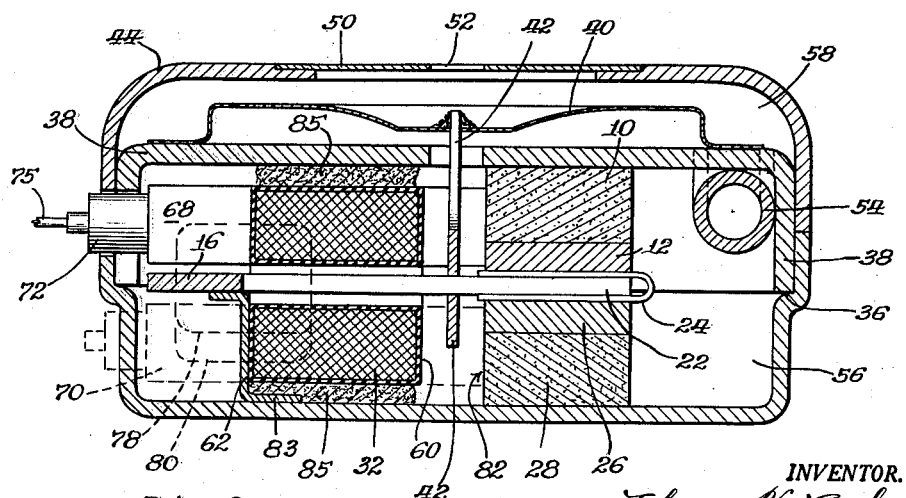

3,111,563
ELECTRO-MECHANICAL TRANSDUCER
Elmer V. Carlson, Prospect Heights, Ill., assignor to Industrial Research Products, Inc., Franklin Park, Ill., a corporation of Delaware
Filed May 5, 1960, Ser. No. 27,006
18 Claims. (Cl. 179—114)

This invention relates to an electro-mechanical transducer of the type employing a magnetic armature having a portion vibratable in an air gap in a steady magnetic circuit. It also relates to an electro-acoustic transducer which employs the electro-mechanical transducer in conjunction with a diaphragm or stylus. In this type of transducer, a permanent magnet provides a steady flux at an air or working gap. This flux is referred to herein as the "steady flux," and the flux conductors and magnet or magnets constitute the "steady flux circuit." There is a coil around the armature which, when the transducer is used as a receiver, is energized so as to induce a flow of flux along the armature, and when the transducer is used as a microphone, flux flowing along the armature induces a potential in the coil. Flux moving along the armature as a result of a signal current in the coil, or as a result of vibration of the armature, is called herein the "signal flux," and the flux conductors forming this flux circuit are called the "signal flux circuit."

The principal object of this invention is to enclose the signal flux circuit substantially entirely within an encompassing steady flux circuit. A feature of this invention is the positioning of a flux-conductive case in the steady flux circuit so as to be substantially the sole magnetic conductor in part of the steady flux circuit. Contrasting this object and feature with existing transducer design, in the latter, the electro-mechanical transducer is a complete assembly within a case. The case, whether magnetic or nonmagnetic, is spaced from a complete electro-mechanical transducer therein. That is to say, the steady flux circuit of present transducers utilizes flux conductors which perform the flux-conductive function and little more. While the conductors of the steady flux circuit may be related to the conductors of the signal flux circuit, they are more often than not arranged to separate the flux fields from the two circuits rather than to combine them. Separation of the two circuits is desirable. The general object of this invention may also be expressed in this way—to enclose the signal flux circuit completely within the steady flux circuit, or again, to enclose the flux field of the signal flux circuit entirely within any fields created by the steady flux circuit. As will appear, applicant's case at all points is at substantially a common magnetic potential with the result that flux fields originating outside of the case will affect only the steady flux circuit and will not penetrate to the signal flux circuit. Conversely, the signal flux circuit and fields generated by it will be confined within the case.

The second object of this invention is to engage the poles of one or more magnets with the inside wall of a flux-conductive case in such a manner as to retain the desirable common magnetic potential throughout the case. A feature of this invention is a magnet stack consisting of two elongated, spaced magnets, transversely magnetized with their outer poles of opposite polarity and in physical engagement with opposite inside walls of the case.

Another object of this invention is to center substantially an armature within the flux-conductive case so that the armature is at very nearly the same steady magnetic potential as the case.

Another object of this invention is to utilize a freely vibratable E-shaped or U-shaped armature. A feature of the invention is the mounting of the ends of the outer arms of an E-shaped armature fixedly in the space between the two magnets so that the entire armature may vibrate freely and not merely the end of the center arm which is disposed in an air or working gap between the magnets. This is to be contrasted with structures holding the E-shaped armature along its base which necessarily involves establishing a fixed relationship between such a holding means and the magnet.

An ancillary object is to limit transverse movement of the E- or U-shaped armature to a point well within the range wherein movement of the armature will exceed the elastic limit of its material. If the armature should move a greater distance, it may take a permanent set with permanent injury to the transducer. Applicant employs one of two means to accomplish this object. One means holds the armature at a node of vibration. This leaves the armature free to vibrate, but if the transducer is struck as by hitting a floor and the shock is sufficient so that the mass of the armature would deflect it so as to exceed its elastic limit, usually near the fixed gap, the holding means at the node of vibration will provide the necessary support. An alternative means is the positioning of stops on either side of the armature and supported by the case at a distance such that deflection of the armature is held within safe limits, although permitting free vibration in normal operation.

These and such other objects of the invention as may hereinafter appear are attained in the embodiment of the invention hereinafter described and shown in the drawings, wherein:

FIGURE 1 is a perspective view, partly cut away and partly exploded, of applicant's electro-acoustic transducer with the coil shown schematically;

FIGURE 2 is a top plan view, partly cut away;

FIGURE 3 is a view taken on the line 3—3 of FIGURE 2;

FIGURE 4 is an elevation of that side showing the coil and lid terminal posts;

FIGURE 5 is a view taken on the line 5—5 of FIGURE 2; and,

FIGURE 6 is a fragmentary view of the end of the coil assembly engaging the central arm of the E-shaped armature at its node of vibration.

Continuing to refer to the drawings, the transducer motor consists of an internal assembly and a flux-conductive case. The internal assembly consists of a magnetic stack and armature and coil. The magnetic stack comprises a magnet 10, flux-conductive pole piece 12, a spacer of low flux conductivity 14, an E-shaped armature 16 having side arms 18 and 20 and a central vibratable arm 22, a second spacer of low flux conductivity 24, a second flux-conductive pole piece 26, and a second magnet 28. The magnets are transversely magnetized as indicated. The pole pieces 12 and 26 are coextensive with the magnets 10 and 28. For simplicity in construction, the two spacers 14 and 24 may be made from a single U-shaped member of low flux conductivity which is slipped over the end of the arm 20 of the armature 16. Around the arm 18 is a second pair of spacers 30 of low flux conductivity. A coil 32 surrounds the center arm 22 of the E-shaped armature and is spaced therefrom. Between the working end of the central arm 22 and the pole pieces 12 and 26, there are no spacers, but an air gap in which the armature arm 22 is free to vibrate. This is called the working gap. The numerals with arrowhead lead lines 122 and 124 identify the fixed magnetic gaps, and the numeral 126 identifies the working gap.

The foregoing describes the complete motor assembly, which is temporarily held in assembled relationship by any suitable means such as rivets or adhesives. This motor assembly however, would be highly inefficient because there is no good flux conductor connecting the north pole of magnet 10 to the south pole of magnet 28. This conductor is supplied by the case which consists of a bottom receptacle or cup 34 made of material of high flux-conductivity with a peripheral shoulder 36 around the inside of its side walls. Seated against this shoulder is a closure or cup 38, also made of flux-conductive material. Referring to FIGURE 5, the peripheral wall 40 of the closure 38 is in good magnetic connection with the upper part of the side walls of the bottom receptacle 34 to complete a flux-conductive closed path through the two cups 34 and 38 which combinedly form what may be called a flux-conductive envelope.

With the parts thus far described, one has a highly efficient electro-acoustic motor. The steady magnetic flux from the magnets 10 and 28 is provided with an excellent flux-conductive path through the closure 38 and the bottom cup 34—a flux path so uniform that the entire case is substantially at a common potential. Whatever flux fields are developed within the case by the movements of the armature or a current flowing through the coil, will be contained by this flux-conductive case, and similarly any stray fields impinging upon the case will be absorbed there in the steady flux circuit and not penetrate to the armature and coil. As is well understood, where the armature moves as a result of mechanical action, flux will flow in one or the other direction down the central arm 22 of the armature 16 and around the outside arms 20 and 18 through the fixed gap of the magnets to complete the circuit through one or the other of the pole pieces. The flux lines are generally indicated by the dash lines 153. Where the source of energy is current in the coil, reversal of direction of current in the coil causes reversal of direction of the flux along the arm 22 and the circuit is completed as before. Referring to FIGURES 1 and 5, the closure 38 is centrally apertured and a diaphragm 40 is mounted on the outside of the closure 38. Centrally of the diaphragm 40 is anchored a link 42 which is also anchored on the central arm 22 of the armature 16. Mounted over the diaphragm is a lid 44 which is preferably of flux-conductive material which has a central opening 46, shoulder 48, and an insert 50 having a small central opening 52. This lid 44 is pressed against the bottom receptacle 34 adjacent the closure 38. The steady magnetic potential of the lid 44 is close to the common potentiol of the direct flux circuit of the bottom receptacle 34 and the closure 38.

In speaking of the case in this invention, the lid 44 may in fact be the case, but this is because the diaphragm 40 is located outside of the closure 38. The diaphragm can be positioned inside the closure under which circumstances the lid 44 would not be used. Similarly, if a stylus were connected to the armature, it would occupy a position such as that of the drive link 42.

The signal flux circuit, therefore, consists of the armature 16 and the pole pieces 12 and 26. The steady flux circuit consists of the magnetic stack and the magnetic case. The two circuits intercept each other at the fixed gaps 122 and 124 and the working gap 126. The entire flux circuit is within the steady flux circuit whose major conductor, the case, both shields the signal flux circuit from fields external to the case and restricts signal flux fields to the case.

When the diaphragm or stylus is added to the electromechanical transducer described, one has an electro-acoustic transducer.

Describing other elements of the invention, the numeral 54, referring to FIGURE 3, identifies an inertance tube which opens into the back or motor cavity 56 of the transducer, and also into the shallow front cavity 58, see also FIGURE 2.

The coil of wire 32 extending approximately to the dotted lines 60 in FIGURE 4 is either wound on a bobbin or encased in at least a partial enclosing shroud having the general configuration of the dotted lines 62, and having the recesses 64 and 66 provided to provide an upper and lower limit of movement of the arms 18 and 20 of the armature in the event of shock. Lead wires 73 and 75 electrically extending the ends of the winding, may also have insulating shrouds 72, 74, 68 and 70 serving to space the coil within the housing and to insulate the lead wires 73 and 75 from the housings. Alternatively, the excess material 62 exterior to the winding 60 may be eliminated and the coil positioned by placing adhesive cement 85 between the coil 32, the housing 34 and/or the housing 38, the coil in this construction not being in physical contact with any portion of the armature 16.

When one of these microphones or receivers is dropped on a hard surface from a distance of several feet or more, the vibrating components such as the armature may be subjected to an acceleration of several thousand times that of gravity. Even when one is mounted in a complete device, such as a hearing aid, in the normal manner with compliant supports, it has been found that the acceleration may exceed 2000 times gravity when the complete device is dropped a distance of five feet. Accelerations of this magnitude in the direction of motion of the armature make the present type transducer inoperative or seriously impair their performance.

To provide performance characteristics which are independent of temperature and ageing effects, it is desirable that the armature 16 be so supported that it can expand and contract without constraint and that any changes in magnet and pole piece position should not influence the relative position of the armature center arm 22 with respect to the operating air gap. The vibration amplitude of the armature has a maximum at the working gap end of the center arm 22 at 126. The amplitude diminishes gradually and is very nearly zero where the center arm 22 is attached to the rear transverse arm 16, along line 76, see FIGURE 1. This amplitude minimum or node may be slightly within transverse member 16; that is, slightly back of the plane of the rear end of the coil. Beyond this node, the displacement is normally opposite in direction and increases towards the corners of the E where the transverse member 16 joins the side members 20 and then diminishes rapidly to zero at the point of attachment of the members 20 to the spacers 14. This node is a "virtual" fulcrum and at this point it is possible to provide a support member which is quite rigid in a direction normal or vertical to the armature without sensibly affecting the vibration of the armature providing the support member does not prevent the armature from rocking about this fulcrum region. The supsport member 83 in FIGURE 3 performs this function. It may be spot welded or otherwise attached to the transverse armature member 16 near the dotted line near where the center member 22 joins it, or at approximately the dotted line shown in FIGURE 1. The exact location of the node will depend on the shape of the particular armature used, but in any event, the preferred arrangement is one in which the support is placed at or near a node but in a way that permits substantially normal vibratory motion of the entire armature. In the embodiment shown in FIGURE 3, the member 83 is cemented to the rear end of the coil while removable positioning members are placed in the opening in the coil to center the arm 22 in the coil. When this cement is rigid, the positioning members are removed and the coil and armature, together with the pole pieces, magnets and the rest of the motor sub-assembly are centered within the bottom receptacle or cup 34. Just prior to insertion, a drop of cement 85 is added to the under and upper sides of the coil so that the shock member 83 and the coil 32 are cemented to the cup 34. The cement on the upper part of the coil 32 serves to hold it in position with respect to cup 38.

Further shock protection is provided by the notches 64 and 66. These are so dimensioned and positioned with respect to the arms 18 and 20 that they do not prevent motion between these arms and the bobbin wall in normal operation. If, however, a high stress is applied to the armature by sudden deceleration or acceleration, the sides of the slots serve as bumpers or stops to prevent excess motion. For moderate shock requirements, the shock member 83 is not required, if the size of the opening or slots in the coil are so dimensioned that the armature is stopped before it exceeds its elastic limits. In the structure shown which is ⅜ inch square, it is desirable to limit the displacement of any part of the armature to approximately .005 inch.

An alternative means of supporting the armature 16 at its node of vibration is shown in FIGURE 6 where the numeral 71 identifies a portion of a metallic or plastic end wall of the coil, corresponding to 62 in FIGURE 3. A flattened diamond-shaped opening is dimensioned to engage the central arm 22 close to the line 76 of FIGURE 1. Movement of the wall 71 is constrained by the inside wall of the case, or by being affixed to the coil, which is otherwise restrained, as by the cement 85.

Where the transducer is used as a microphone, ideally the magnets are of identically the same length because if the geometry and relationship of all of the parts is perfect, there will be no flow of flux along the armature. Where the transducer is used as a receiver, the general practice of hearing aid manufacturers is to operate the coil at a selected direct current level with the result that with exactly equal magnets, there will be a continual flow of flux in one direction along the armature. The preferred method of establishing a bucking or counter-flux so as to balance the steady flux in the armature in this design is to make one magnet longer or stronger than the other and to clamp the armature nearer one pole piece than the other by having thinner spacers between one pole piece and the clamped armature ends so as to oppose this flux generated by a continuous current through the coil and exactly neutralize it. In this case, spacers 14 and 30 are replaced by two thin spacers on one side and two normal spacers on the other side of the armature.

Applicant has shown an E-shaped armature. A U-shaped armature may be used, in which case the total area of the armature in the fixed gap will approximately equal the total area of the armature in the working gap. Where the E-shaped armature is used, the combined areas of the two ends of the arms 18 and 20 in the fixed gaps equals the total area of the arm 20 in the working gap. For ideal operation, the total area of the bottom receptacle 34 and the closure member 38 should be approximately the same in order to establish a uniform steady flux potential in the case as a whole.

The electro-acoustic transducer described has a very low sensitivity to external fields (approximately 1% of conventional types), when used as a microphone, and generates very little external field when used as a receiver. For a given separation, this permits up to 40 decibels more gain without instability or permits mounting more closely together (within a few thousandths of an inch) with a conventional amplifier. This is done without any auxiliary magnetic shield that requires very precious space. Even a moderate acoustical pressure amplification of 100 times (40 decibels) in a typical hearing aid necessitates an electrical power amplification of 100 million times (80 decibels) or more. As the aid is made more compact, the separation between the microphone and receiver is necessarily reduced if they are mounted in the same housing. This is normally the practice in back-of-the-ear aids. Since the magnetic coupling varies roughly inversely with the cube of the separation, the magnetic coupling problem becomes acute. Magnetic shields external to the magnetic circuits of the transducer and external to the complete transducer reduce the coupling but require a prohibitive amount of space, and also increase the magnet leakage field, thereby impairing the performance. Even though positioned to minimize coupling, the relative positioning for minimum coupling becomes too critical and cannot be preserved in production or in use. The design shown herein reduces the electrical power induced in a microphone by a receiver (both of this construction) by a factor of nearly 10,000 (i.e., an induced voltage ratio of nearly 100) compared to the commonly used types. This makes it possible to mount the two transducers very close together without excessive magnetic coupling in some applications. It also results in a more stable performance of the aid since the relative microphone and receiver orientations are not critical.

An important advantage of the use of the case as substantially the sole flux conductor of a major portion of the steady flux circuit is that one eliminates at least two thicknesses of flux conductors in the assembly. This substantially decreases the volume of the case and importantly, narrows the case along the dimension which is at right angles to the plane of the diaphragm.

The lid or top cover 44, FIGURES 1 and 3, when made of magnetic material, performs two functions: That of an additional magnetic shield and that of forming the major wall of the front acoustic cavity 58. Due to its good contact with the upper cup 38 and the lower cup 34, the cover 44 is substantially at the common potential.

The transducer shown is .375 inch square and .185 inch thick, these being the over-all outside dimensions. The parts are very small. The arrangement of the conductors comprising the two flux circuits, magnets and coil, is important, therefore, not only from the standpoint of function, but also because of their providing great compactness.

Having thus described my invention, what I claim is:

1. An electro-mechanical transducer comprising a steady flux circuit which includes a first and a second permanent magnet spaced from one another with their opposite poles confronting across a working gap, and a flux conductor connecting the remote poles of the magnets to complete the steady flux circuit to the working gap; and a signal flux circuit which includes an armature having one end fixed with respect to the magnets and the other end vibratable in the working gap, and a coil around a portion of the armature; the flux conductor of said steady flux circuit comprising a substantially continuous, flux-conductive envelope.

2. An electro-acoustic transducer comprising a steady flux circuit which includes an enclosing flux-conductive envelope, two permanent magnet means having opposite poles contacting the interior wall of the envelope at spaced points to flux-conductively connect said opposite poles, said magnets being spaced from each other with their other opposite poles confronting one another across a working gap in said steady flux circuit within the envelope; a signal flux circuit which includes an armature having one end mounted in fixed relation to said magnets and having a vibratable portion in the working gap of the steady flux circuit, and a coil around the armature; a port through one wall of the envelope, a drive link mounted on the vibratable portion of the armature and extending through the port, and acoustic means on the free end of the link.

3. The electro-acoustic transducer of claim 2 wherein the acoustic means is a diaphragm.

4. The electro-acoustic transducer of claim 2 wherein the acoustic means is a diaphragm mounted on the outside wall of the envelope and a magnetic cover containing a sound port is mounted over the diaphragm in flux-conductive relationship to the envelope.

5. An electro-mechanical transducer comprising a pair of spaced permanent magnets with their poles in series relationship, the space between the magnets including an air gap, an armature and coil therearound positioned adjacent the magnets, one end of the armature being fixed between spacers of low flux conductivity in the space between the magnets and the other end being vibratable in the air gap, and a flux-conductive case engaging the outer opposite poles of the two magnets to form around the entire assembly a substantially closed circuit for the steady flux from the permanent magnets.

6. The electro-mechanical transducer of claim 5 wherein the magnets are elongated and magnetized transversely to their length and the armature has two parallel arms joined at one end of each, the free end of one arm being mounted in fixed relationship between the magnets and the free end of the other arm being vibratable in the working gap.

7. The electro-mechanical transducer of claim 6 together with means fixed with respect to the case for holding the armature.

8. The electro-mechanical transducer of claim 6 together with means fixed with respect to the case for stopping lateral displacement of the armature beyond its elastic limit.

9. An electro-mechanical transducer comprising a magnetic bottom cup, having a flat bottom portion, a permanent magnet having one pole contacting said flat bottom portion, a spacer mounted on the other pole of said magnet, a U-shaped armature having the end of one arm engaging said spacer, a second spacer mounted on the same arm of the armature, a second like permanent magnet mounted on the spacer, the end of the second arm of the armature being vibratable in air between the magnets, a coil around one arm of the armature, and a magnetic top cup having a flat top portion, the inside wall of said flat top portion contacting the pole of the second magnet opposite to the pole of the first magnet.

10. An electro-mechanical transducer comprising a magnetic bottom cup having an elongated flat bottom surface, an elongated permanent magnet transversely magnetized having one pole contacting said flat bottom portion, a spacer mounted on each end of the opposite pole of said magnet, an E-shaped armature having the end of each outer arm mounted on one spacer, a spacer mounted on the end of each outer arm, a like transversely magnetized magnet mounted on the second spacer, the end of central arm being positioned and vibratable between the magnets, a coil around a portion of the armature, and a magnetic top cup having a flat top portion contacting that pole of the second magnet opposite to the pole of the first magnet.

11. The electro-mechanical transducer of claim 10 together with means holding the E-shaped armature in fixed relationship to the cups near the line of joinder of its central arm to the base of the E.

12. The electro-mechanical transducer of claim 10 together with a flexible bracket having one end fastened to one cup and the other end flexible in the plane of the armature fastened to the armature near the line of joinder of its central arm to the base of the E.

13. The electro-mechanical transducer of claim 10 together with a thin end wall mounted on the coil, said thin end wall having an opening therethrough of a configuration and size such as to engage the opposite edges of the central arm of the armature near the node of vibration of the armature.

14. The electro-mechanical transducer of claim 10 wherein a pole piece is positioned between each pole face and the adjacent spacer.

15. An electro-mechanical transducer comprising a steady flux circuit which includes two spaced, permanent magnets with opposite poles facing each other on either side of a working gap and a fixed gap, and a magnetic case connecting the second poles of the magnets respectively to each other; and a signal flux circuit which includes a pole piece on each magnet gap face, an armature having one portion fixedly mounted between spacers of low flux conductivity in the fixed gap and having its other end vibratable in the working gap, and a coil around a portion of the armature; said case substantially enclosing all of the elements of the signal flux circuit.

16. An electro-mechanical transducer comprising two permanent magnets spaced from each other to form a working gap with the opposite poles of the magnets facing each other, an armature mounted in fixed relationship to the magnets and having a vibratable portion in the working gap, a coil around the armature, and flux-conductive members enclosing the foregoing elements, said flux-conductive members being in flux-conductive engagement with the outer poles of both magnets so as to form a part of the steady flux circuit of the transducer and substantially completely enclose the working mechanism within that circuit.

17. An electro-acoustic transducer comprising two permanent magnets spaced from each other to form a working gap with the opposite poles of the magnets facing each other, an armature mounted in fixed relationship to the magnets and having a vibratable portion in the working gap, a coil around the armature, a flux-conductive cup in which the foregoing assembly is seated with the outer pole of one magnet in flux-conductive relationship with the cup, a flux-conductive lid covering the cup and engaging the outer pole of the other magnet so that the cup and the lid form an enclosing portion of the steady flux circuit from the magnets, an opening through said lid, a drive pin mounted on a vibratable portion of the armature and extending through said opening, a diaphragm mounted externally of the lid and connected to the outer end of the drive pin, and a second lid mounted on the first lid over the diaphragm, there being a sound opening through the second lid.

18. The electro-acoustic transducer of claim 17 wherein the second lid is made of flux-conductive material.

References Cited in the file of this patent

UNITED STATES PATENTS

| | | |
|---|---|---|
| 2,454,425 | Bauer | Nov. 23, 1948 |
| 2,912,523 | Knowles et al. | Nov. 10, 1959 |
| 2,994,016 | Tibbetts et al. | July 25, 1961 |
| 3,076,062 | Fener | Jan. 29, 1963 |

FOREIGN PATENTS

| | | |
|---|---|---|
| 1,044,169 | Germany | Nov. 20, 1958 |